J. HENBA.
BALLOON.
APPLICATION FILED MAR. 11, 1920.

1,383,206.

Patented June 28, 1921.
6 SHEETS—SHEET 1.

JOSEPH HENBA INVENTOR.

BY

Mason Fenwick & Lawrence
ATTORNEYS.

Inventor
JOSEPH HENBA
By Mason Fenwick Lawrence
Attorneys

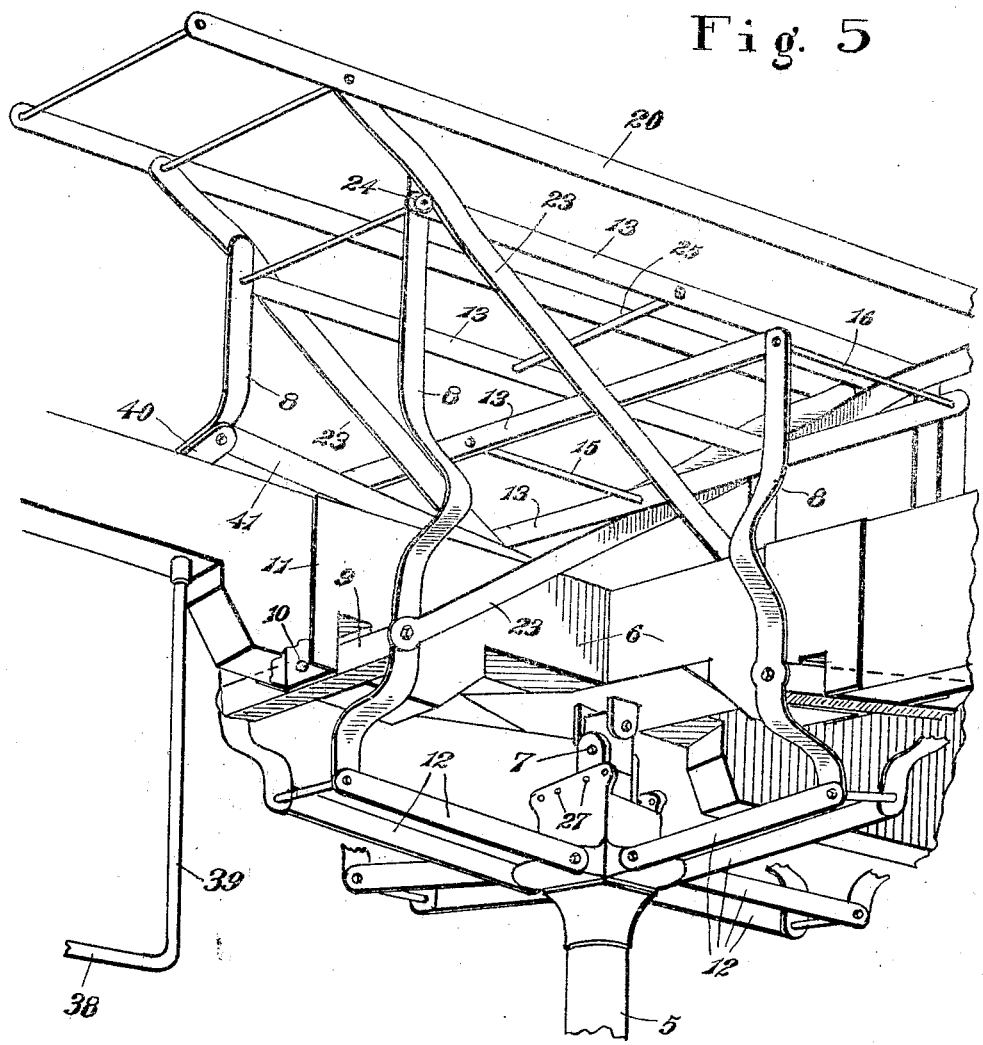

Inventor:-
Joseph Henba

Inventor:
Joseph Henba,

J. HENBA.
BALLOON.
APPLICATION FILED MAR. 11, 1920.

1,383,206.

Patented June 28, 1921.
6 SHEETS—SHEET 6.

Inventor:-
Joseph Henba

By *Mason Fenwick Lawrence*,

Attorneys

UNITED STATES PATENT OFFICE.

JOSEPH HENBA, OF BROOKLYN, NEW YORK.

BALLOON.

1,383,206.   Specification of Letters Patent.   Patented June 28, 1921.

Application filed March 11, 1920. Serial No. 364,976.

*To all whom it may concern:*

Be it known that I, JOSEPH HENBA, a citizen of Poland, residing at Brooklyn, in the county of Kings and State of New York, have invented certain new and useful Improvements in Balloons; and I do hereby declare the following to be a full, clear, and exact description of the invention, such as will enable others skilled in the art to which it appertains to make and use the same.

The objects of this invention are to provide improved means for suspending a car from a balloon by which the car may remain substantially level regardless of the pitching or rolling of the balloon; to prevent swaying of the car under wind pressure, but at the same time to permit the balloon to roll; to permit the load carried by the car to be moved about therein without disturbing the equilibrium of the car; to maintain the proper angular disposition of the supporting cables when the balloon pitches forward or aft; to provide a structure which may be applied to any balloon; to secure simplicity of construction and operation, and to obtain other advantages and results as may be brought out in the following description.

Referring to the accompanying drawings in which like numerals of reference indicate similar parts throughout the several views, Figure 1 is a side elevation of a balloon to which my invention is applied;

Fig. 5 is a perspective view of the lever and link control for the stabilization of the car;

Figure 1:
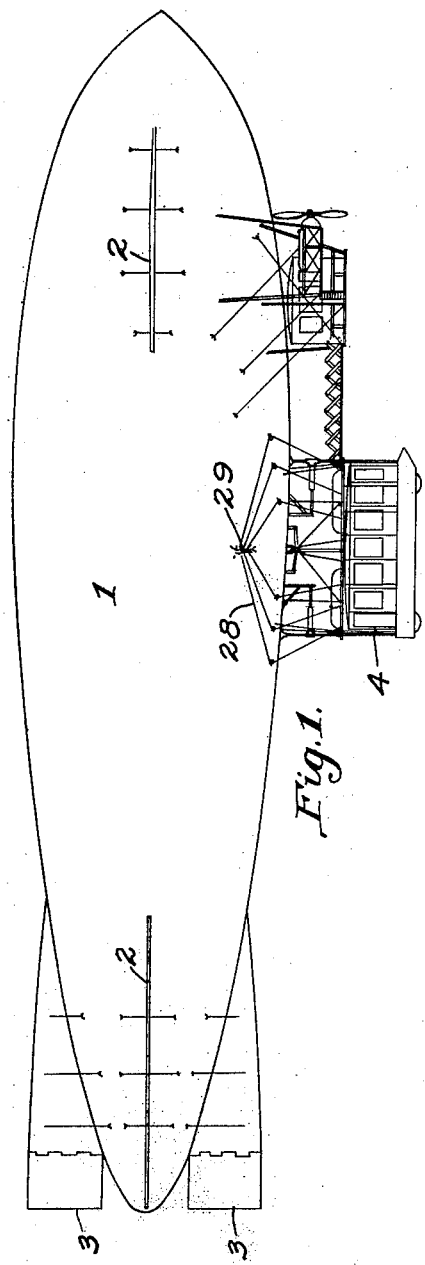

In the specific embodiment of the invention illustrated in said drawings, the reference numeral 1 indicates the balloon or gas bag, which is here shown as of the usual oblong or cigar shape and which may be of any desired structure and provided with the usual wings 2 and rudders 3 for the proper manipulation of the craft. Substantially centrally from this balloon or gas bag 1, is suspended the passenger car 4, and it is the particular suspending means by which this car may maintain its horizontal position to which the present invention relates.

In carrying out the invention, a car suspending bar 5 depends vertically from the balloon preferably at the middle of the car, the upper end of said bar being attached to ribs or girders 6 of the balloon by means of a universal joint 7 so that the said bar may swing freely in any direction with respect to said balloon. This suspending bar forms the main support for the car, but in order to stabilize the car and keep it from swinging to and fro, a system of controlling links and levers is provided in conjunction with stabilizing cables.

As may be more clearly seen in Figs. 5 to 9, this controlling system includes pairs of upright levers 8 arranged on opposite sides of the suspending bar and extending in the same general direction. I have shown four sets of these levers, and the arrangement is such that the pairs of levers on opposite sides of the suspending bar remain parallel or substantially so at all times, and furthermore remain parallel with the suspending bar. Each pair of levers is shown pivoted at the end of a teeter-bar 9, (see Fig. 5), in such manner as to be free to swing toward and away from the normal position of the suspending bar 5. The teeter-bar in turn is pivoted, as at 10, substantially midway of its length to a suitable support 11, carried by the rib 6 of the balloon, so as to rock transversely of the rib and accommodate movement of the levers in a direction transverse to the plane in which they are pivoted to swing. The lower ends of said levers are connected to the suspending bar 5 by means of links 12, and the upper ends of the levers of opposite pairs are connected to each other by links 13.

Figure 9:
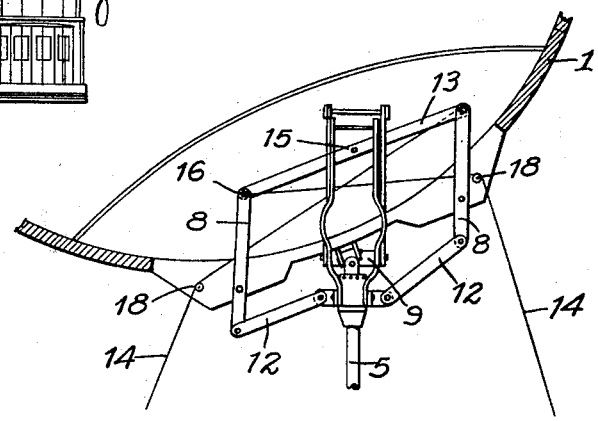
Fig. 9 is an end view of said lever and link construction showing the position of the same when the balloon rolls.
Figure 8:
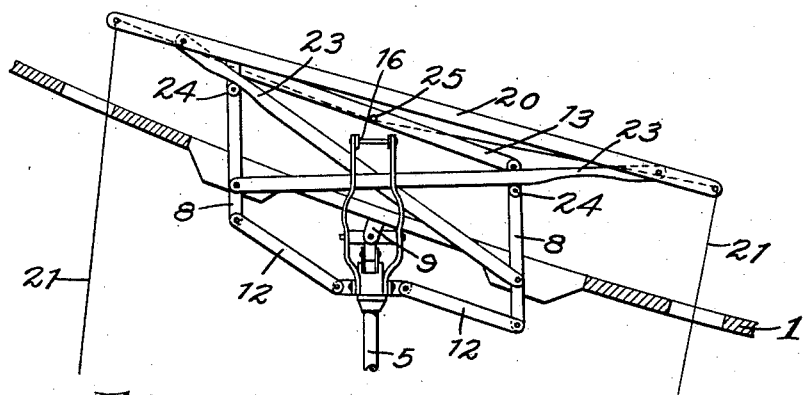
Fig. 8 is a view similar to Fig. 6 showing the position the parts assume when the balloon pitches.

As the car is usually longer in a direction longitudinally of the balloon, I find it desirable to support the stabilizing cables differently for maintaining the car level longitudinally of the balloon than is used to maintain it level transversely of the balloon. For maintaining the car level transversely of the balloon, stabilizing cables 14, (see Fig. 9), which I have shown attached for convenience to a transverse rung or brace 15 connecting the links 13, 13 midway of their length, said cables being extended outwardly longitudinally of the links to the pivot rungs 16 at the ends of the links by which said links and levers 8 are pivotally connected. From thence, the said cables extend diagonally inward, the two diagonal portions of the cable crossing and passing over pulleys 18 on the balloon rib and from thence extending downwardly to the top 19 of the carriage for the car. Obviously, by this construction, when the balloon rolls so that one side is higher than the other, as shown in Fig. 9, the distance from the elevated pivot or rung 16 to the pulley 18 having increased, the cable is drawn upon and elevates the side of the car on the opposite side of the suspending bar from said pivot, and at the same time the other cable slackens, whereby the car is maintained in its horizontal position automatically.

In order to support the ends of the car when the balloon pitches, an auxiliary frame 20 is provided above the upper links 13, said frame extending a distance beyond the said links, and cables 21 passing over rollers carried at the ends of said frame depend substantially vertically to the top 19 of the carriage. Support for this frame is obtained by means of diagonal bars 23 the lower ends of which are pivoted at the point of pivoting of the vertical levers 8 and cross each other and rest upon rollers 24 carried adjacent the top ends of the said vertical levers 8. As the balloon pitches, the frame 20 will be slid toward the lower end of the balloon by means of said diagonal bars 23, and this operation exerts a tension upon the cable 21 at that end of the carriage and thus tends to draw the carriage at that end toward the balloon, thereby maintaining said carriage level. It is to be observed that these last described cables 21 extend from a central rung 25, connecting the longitudinal links 13, said cables extending outwardly to the rollers at the ends of the frame 20 and then extending directly downward without crossing, (as in the case of the transverse cables), and it is because of the frame 20 that crossing of these cables is avoided. Also it is to be observed that the cables extend substantially vertically from their supports on said frame to the top of the carriage at all times because of the shifting of said frame.

It will be noted that the cables 14 which support the car at its sides and the cables 21 which support the car at its ends pass through pulleys 26, (see Fig. 2), upon the top of the carriage and then extend upwardly and are made fast to the suspending bar 5 near its upper end, said bar being shown with a plurality of perforations 27, (see Fig. 5), for attaching said cables thereto.

Figure 2:
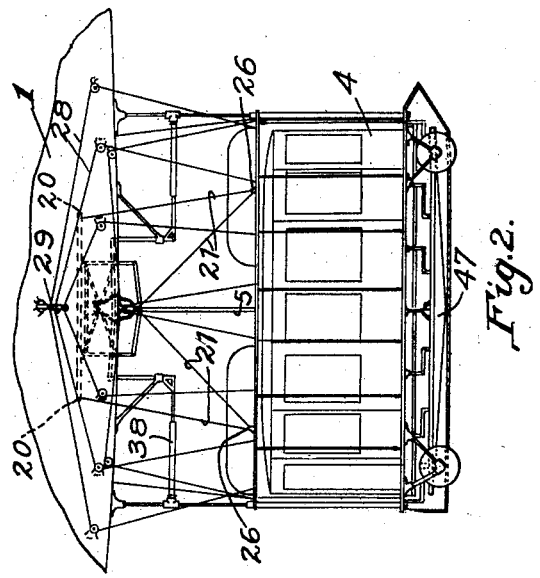
Fig. 2 is a similar view upon larger scale showing the car and in general its supporting means and structure.
Figure 4:
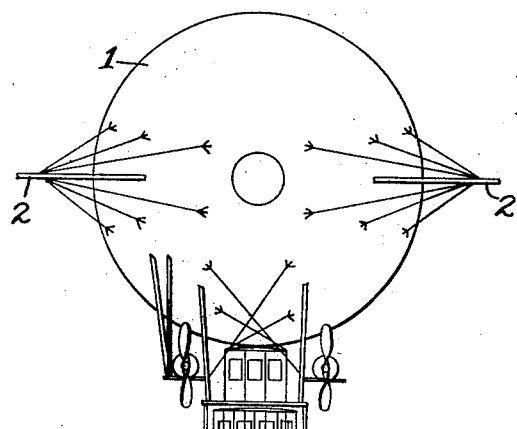
Fig. 4 is a front view of the balloon shown in Fig. 1.
Figure 12:
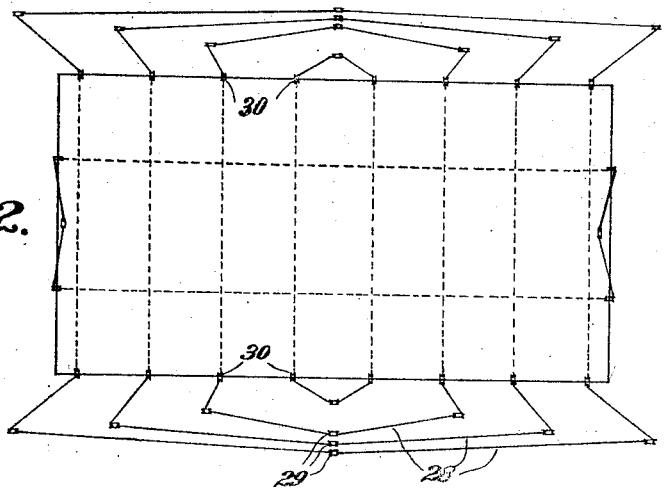
Fig. 12 is a diagrammatic plan of certain of the cables.

In order to provide additional support for the carriage, a plurality of endless cables 28 are provided which, as shown diagrammatically in Fig. 12 and also shown in Figs. 1 and 2, pass through suitable pulleys 29 on one side of the balloon and extend downwardly and through pulleys 30, (see Fig. 12), on the top of the carriage, said cables extending transversely across the top of the carriage and through similar pulleys 30 on that side thereof and from thence upwardly through pulleys on the balloon frame. When the balloon rolls or pitches so as to slacken the cable on one side the slack is taken up by tightening of the cable on the other side, and thus the movement of the car and balloon with respect to each other is compensated for, but at the same time support is given to the carriage and car.

Figure 13:
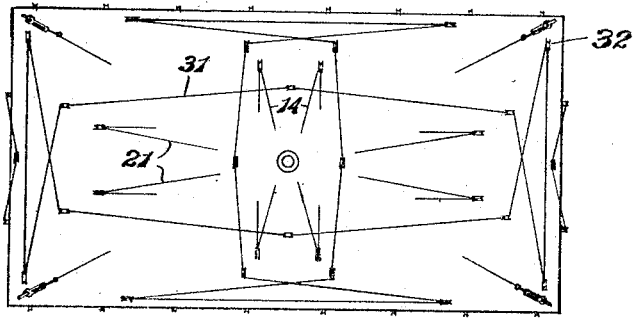
Fig. 13 is a similar diagrammatic plan of other of the cables.
Figure 14:
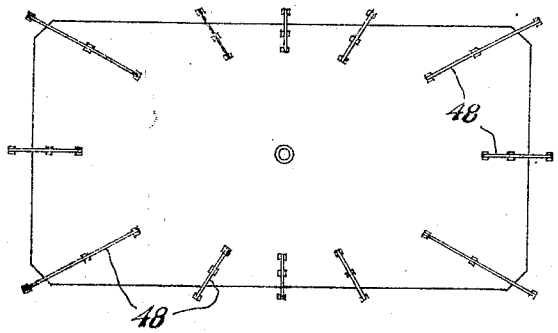
Fig. 14 is an underneath view of the sub-platform.

Similarly, continuous cables 31, (see Figs. 10 and 13), are provided for affording additional support and stabilization, these cables extending longitudinally of the several edges of the top of the carriage, passing through pulleys 32 and upwardly to the balloon, the portions of each cable extending from the pulleys, crossing, and then passing through pulleys to similar portion of the cable at the opposite edge of the top of the carriage. It is to be understood, however, that I may vary the particular arrangements of cables as may be found necessary or desirable in manufacture or use of the invention.

Figure 7:
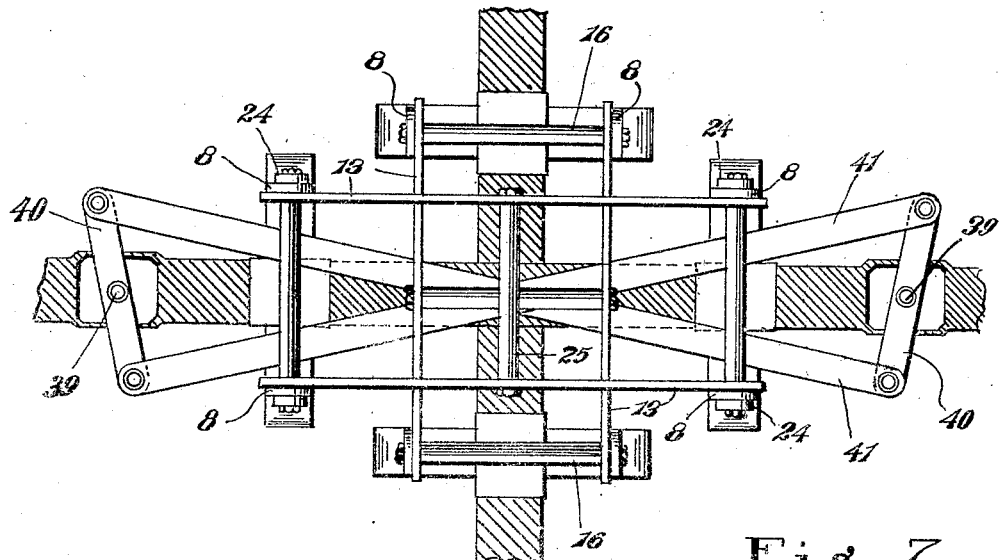
Fig. 7 is a plan view thereof, with certain parts omitted.
Figure 6:
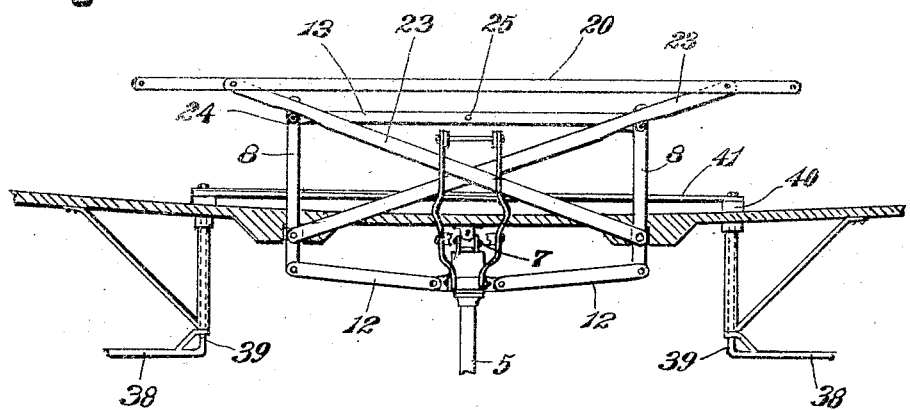
Fig. 6 is a side elevation of the same.
Figures 10, 11:
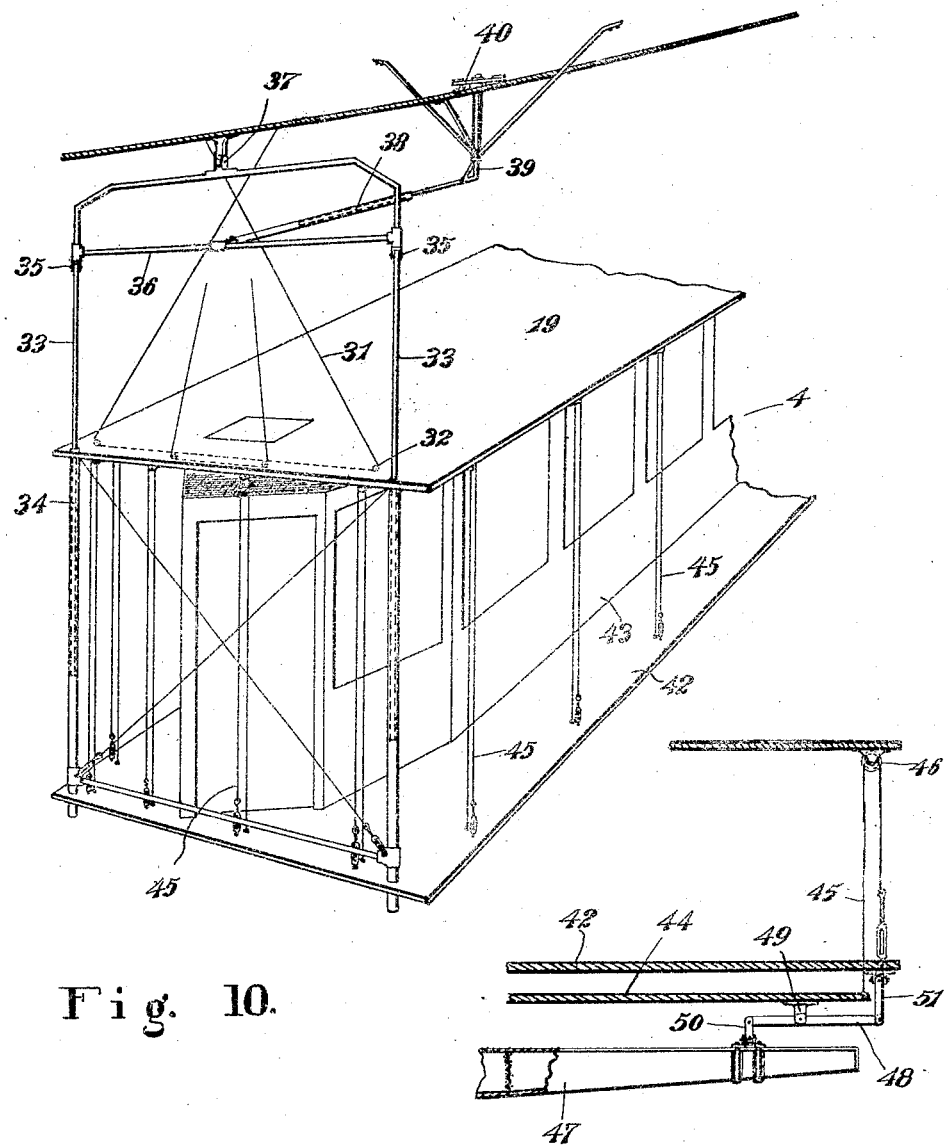
Fig. 10 is a perspective view of the car and a portion of its controlling means as applied to the balloon.
Fig. 11 is a cross sectional view showing the means whereby uneven distribution of the load may be equalized.

Added rigidity for the car against side thrust or wind pressure is obtained by means of telescopic end braces shown in Figs. 6, 7 and 10. These end braces comprise rods 33 which depend at each corner of the carriage into tubular casings 34 and are rigidly secured to the top 19 of the carriage and depend downwardly through the floor of the car forming corner posts. The upper ends of the rods 33 are pivotally carried, as at 35, to a yoke 36 which is in turn supported through a universal joint 37 to the balloon frame. This yoke, also, has connected thereto intermediate of its ends, a horizontally extending and telescopic lever 38, the other end of which is fixed to a vertical rod or shaft 39 mounted in suitable bearings. The upper end of this shaft 39 has a cross-head 40 secured thereto by means of which the rod may be turned and the lever 38 swung. There is a lever 38, shaft 39 and cross-head 40 for each end of the car, and the ends of the cross-heads 40 are connected by diagonal links 41 which cross each other as shown more particularly in Fig. 7.

Figure 3:
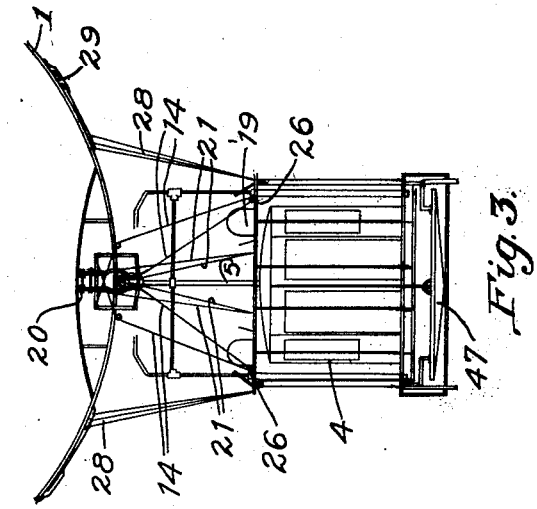
Fig. 3 is an end view of the car as attached to a balloon.

In order to permit the load in the car to be shifted around, as for instance by the passengers moving around from place to place therein, I provide means for counterbalancing an excessive load on one side. In carrying out this feature of the invention, the car is provided with floor 42, (see Figs. 10 and 11 particularly), which is fast or integral with respect to the sides 43 of the car, and also provided with a sub-floor 44, (see Fig. 11), which is movable with respect to the fixed floor 42. This sub-floor is supported by means of cables 45 at is several edges, said cables extending upwardly through the fixed floor 42 and passing around pulleys 46 carried by the top 19 of the carriage and then returning to the fixed floor 42 to which they are attached. It may here be noted, that the top 19 of the carriage and the car 4 may move independently of each other, so that said top 19 and the floor 42 may approach each other or be separated. When a greater load is upon the floor 42 at one side than at the other, it will be depressed, thus increasing the distance between said floor 42 and the top 19 of the carriage. In being so depressed, the floor 42 approaches the sub-floor 44, and due to the cable connection between them, the sub-floor 44 also approaches the floor 42. Beneath the sub-floor 44 is suspended a tank 47. (See Figs. 2, 3 and 11.) For supporting said tank, a plurality of transverse levers 48 are provided thereabove fulcrumed in suitable brackets 49 on the under side of the sub-floor 44, said levers having links 50 at their inner ends which are connected to the tank near the outer edge thereof. Said levers also have links 51 at their outer ends which are connected to the fixed floor 42 of the car. The tank 47 preferably tapers from all sides downwardly to the center and is partly filled with some suitable liquid which will flow from one part of the tank to another in seeking its lowest level. Thus, when the tank is tilted, the liquid will shift its position and thus apply weight to a different portion of the car. By the arrangement shown, depression on the fixed floor 42 at one side operates through the supporting cables 45 and lever 48 to tilt the tank upwardly at that side and thus shifts the liquid in the tank to the opposite side thereby compensating for the unevenness in the load and operating to maintain the car in its level position. To prevent swishing of the fluid in the tank suitable baffles or screens 53 may be secured therein to retard movement of the fluid, as may be seen by reference to Fig. 11. It may also be added, that the tubular members 34, (see Fig. 10), which are fixed with respect to the top 19 of the carriage, depend through the floor 42 which may slide up and down thereon as necessary, said tubular members 34 being suitably braced so as to prevent the car from swaying with respect to the top 19.

Obviously detail changes and modifications may be made in the construction of my improved balloon, and I do not wish to be understood as restricting myself except as required by the following claims when construed in the light of the prior art.

Having thus described my invention, I claim:—

1. A device of the character described comprising a balloon or the like, a car supporting element, a car suspended from said balloon by the supporting element, cables for stabilizing the car against tilting, and means for automatically and positively varying the effective length of said cables between the balloon and car as necessary to maintain the car substantially level.

2. A device of the character described comprising a balloon or the like, a supporting element, a car suspended from said balloon by said supporting element, cables for stabilizing the car against tilting, and means carried by the supporting element for automatically and positively shortening the effective length of certain of said cables between the balloon and car at one side thereof and simultaneously lengthening the effective length of said cables at the opposite side as necessary to maintain the car substantially level.

3. A device of the character described comprising a balloon or the like, a supporting element, a car suspended from said balloon by said supporting element, cables for stabilizing the car against tilting, and levers carried by said supporting element adapted to be operated by relative movement between said balloon and car and connected with said cables whereby said relative movement of the balloon and car will automatically adjust the effective length of the cables so as to balance the car and maintain it substantially level.

4. A device of the character described comprising a balloon or the like, a car, a central universal suspension means for said car, cables at a distance from said suspension means on the several sides thereof for supporting said car against tilting, and means associated with and actuated by said suspension means for increasing and shortening the effective length of said cables for maintaining the car substantially level.

5. A device of the character described comprising a balloon or the like, a car, a depending suspension means supporting said car at its middle part, a universal connection between said balloon and said suspension means, cables at a distance from said suspension means on the several sides thereof for supporting said car against tilting, levers at opposite sides of said suspension means connected therewith and with the cables for automatically increasing and shortening the effective length of said cables for maintaining said car substantially level.

6. A device of the character described comprising a balloon or the like, a car, a depending suspension means supporting said car at its middle part, a universal connection between said balloon and said suspension means, cables at a distance from said suspension means on the several sides thereof for supporting said car against tilting, levers at opposite sides of said suspension means pivoted to said balloon, links connecting corresponding ends of said levers to the suspension means, and connecting bars between the other ends of corresponding pairs of levers for operating said levers in unison from said suspension means, said cables being connected with said levers whereby the effective length of the cables may be automatically adjusted.

7. A device of the character described comprising a balloon or the like, a car, a depending suspension means supporting said car at its middle part, a universal connection between said balloon and said suspension means and means for supporting said car against tilting, comprising a plurality of levers at opposite sides of said suspension means pivoted to said balloon, links connecting corresponding ends of said levers to the suspension means, connecting bars between the other ends of corresponding pairs of levers for operating said levers in unison from said suspension means, a shifting frame, and means for supporting and operating said frame from the levers, said cables being connected with said frame whereby the effective length of the cables may be automatically adjusted by shifting of the frame.

8. A device of the character described comprising a balloon or the like, a car, a depending suspension means supporting said car at its middle part, a universal connection between said balloon and said suspension means and means for supporting said car against tilting, comprising a plurality of levers at opposite sides of said suspension means pivoted to said balloon, links connecting corresponding ends of said levers to the suspending means, connecting bars between the other ends of corresponding pairs of levers for operating said levers in unison from said suspension means, a shifting frame, and diagonal bars slidably supported and actuated by said levers for supporting and operating said frame from said levers, said cables being connected with said frame whereby the effective length of the cables may be automatically adjusted by shifting of the frame.

9. A device of the character described comprising a balloon or the like, a car adapted to swing with respect to the balloon, levers pivotally carried by the balloon and connected with said car so as to be operated by swinging of said car, diagonal bars slidably supported and actuated by said levers, and cables depending from said diagonal bars to the car for supporting the same, tilting of the balloon with respect to the car operating through said levers, bars and cables to maintain the car in substantially level position.

10. A device of the character described comprising a balloon or the like, a car adapted to swing with respect to the balloon, diagonal bars slidably supported, means for actuating said bars by relative tilting of the balloon with respect to the car, and cables depending from said diagonal bars to the car for supporting the same, tilting of the balloon with respect to the car operating to shift the bars and maintain the car in substantially level position.

11. In a device of the character described, a car, a balancing tank adapted to be partly filled with liquid, said tank tapering from its sides inwardly downward toward its middle whereby the liquid will normally rest at the middle of the tank and may be shifted in the tank by tilting thereof, transverse baffles in the tank to retard the flow of the fluid and prevent backwash and means for tilting said tank in an opposite direction from tilting of the car, thereby tending to counterbalance the uneven distribution of the load on the car.

In testimony whereof I affix my signature.

JOSEPH HENBA.